(12) United States Patent
Gossing et al.

(10) Patent No.: US 10,046,385 B2
(45) Date of Patent: Aug. 14, 2018

(54) DIE CAST COMPONENT AND A METHOD FOR PRODUCING A DIE CAST COMPONENT

(71) Applicant: HDO Druckguss-und Oberflaechentechnik GmbH, Paderborn (DE)

(72) Inventors: Alexander Gossing, Paderborn (DE); Arno Lauterbach, Bad Wuennenberg (DE); Peter Kiessler, Borchen (DE); Andreas Oeffler, Erwitte (DE); Josef Stuempel, Borchen (DE); Ulrich Franke, Paderborn (DE); Heinz Herberhold, Lippstadt (DE); Dieter Stollburges, Borchen (DE)

(73) Assignee: HDO Druckguss-und Oberflaechentechnik GmbH, Paderborn (DE)

( * ) Notice: Subject to any disclaimer, the term of this patent is extended or adjusted under 35 U.S.C. 154(b) by 188 days.

(21) Appl. No.: 13/891,872

(22) Filed: May 10, 2013

(65) Prior Publication Data
US 2013/0299026 A1    Nov. 14, 2013

(30) Foreign Application Priority Data

May 10, 2012  (EP) ..................................... 12167501
Nov. 17, 2012  (WO) ................. PCT/EP2012/072938
Nov. 17, 2012  (WO) ................. PCT/EP2012/072939

(51) Int. Cl.
*B22D 17/00*  (2006.01)
*B22D 17/24*  (2006.01)
(Continued)

(52) U.S. Cl.
CPC ............. *B22D 17/00* (2013.01); *B22D 17/24* (2013.01); *B22D 19/0045* (2013.01);
(Continued)

(58) Field of Classification Search
CPC .... B22D 17/00; B22D 17/24; B22D 19/0072; B22D 19/04; E03C 1/04; E03C 1/0404
(Continued)

(56) References Cited

U.S. PATENT DOCUMENTS 2,219,471 A    10/1940  Davis
2,337,550 A *  12/1943  Crosby ............. B29C 45/14778
                                                    264/250
(Continued)

FOREIGN PATENT DOCUMENTS

DE    525762 C    6/1932
DE    525762 C    7/1932
(Continued)

OTHER PUBLICATIONS

Applications of Ilzro Bettelle Research Findings, "Producing Thin-Wall Zinc Faucet Die Castings", Die Casting Engineer, Mar.-Apr. 1974, pp. 12-16.
(Continued)

*Primary Examiner* — Kevin P Kerns
(74) *Attorney, Agent, or Firm* — Berenato & White, LLC

(57) ABSTRACT

The present invention provides a die cast component, in particular a water outlet fitting, containing a base body (1) produced from metal or a metal alloy by the die casting method and having a cavity in which a number of openings (2, 3, 4) are provided by which the cavity is accessible from the outside, the cavity being at least partially filled with a casting core (5) that is in two-dimensional contact with the inside of the base body (1) and in which at least one channel (6) is provided for the conveyance of fluid, the casting core (5) being made of a material the melting point of which is lower than the melting point of the material from which the base body (1) is produced, and that the outside of the casting core (5) rests with at least substantially all of its surface
(Continued)

against the inside of the base body (1). Furthermore, the invention also provides a method for producing this type of die casting component.

14 Claims, 3 Drawing Sheets

(51) Int. Cl.
    *B22D 19/00*     (2006.01)
    *B22D 19/04*     (2006.01)
    *E03C 1/04*     (2006.01)
    *F16K 27/04*     (2006.01)

(52) U.S. Cl.
    CPC ......... *B22D 19/0072* (2013.01); *B22D 19/04* (2013.01); *E03C 1/04* (2013.01); *F16K 27/045* (2013.01); *E03C 1/0404* (2013.01); *Y10T 137/9464* (2015.04)

(58) Field of Classification Search
    USPC .................... 137/801; 164/113; 264/267, 269
    See application file for complete search history.

(56) References Cited

U.S. PATENT DOCUMENTS

| | | | |
|---|---|---|---|
| 2,795,844 A | | 6/1957 | Liszak |
| 3,448,768 A | * | 6/1969 | Keller, III ............. F16K 19/006 118/621 |
| 3,521,884 A | * | 7/1970 | Olstowski et al. ...... A63D 9/00 473/121 |
| 4,762,143 A | * | 8/1988 | Botnick .................... 137/15.01 |
| 4,854,613 A | | 8/1989 | Reece et al. |
| 5,146,951 A | * | 9/1992 | Chuang ................. E03C 1/0403 137/594 |
| 5,579,823 A | | 12/1996 | Mikol et al. |
| 7,036,556 B2 | * | 5/2006 | Caputo et al. ................ 164/369 |
| 2003/0062088 A1 | | 4/2003 | Perla |
| 2005/0103389 A1 | | 5/2005 | Wei |
| 2006/0096567 A1 | | 5/2006 | Henkel |
| 2006/0254650 A1 | | 11/2006 | Wu et al. |
| 2007/0271695 A1 | | 11/2007 | Thomas et al. |
| 2008/0120773 A1 | | 5/2008 | Lin |
| 2013/0299027 A1 | * | 11/2013 | Gossing et al. ............. 137/801 |
| 2013/0299028 A1 | * | 11/2013 | Gossing et al. ............. 137/801 |

FOREIGN PATENT DOCUMENTS

| | | |
|---|---|---|
| DE | 3838935 A1 | 8/1989 |
| DE | 19639320 A1 | 3/1998 |
| DE | 10246861 A1 | 4/2004 |
| DE | 202006001465 U1 | 7/2006 |
| DE | 102007055328 A1 | 5/2009 |
| DE | 102009024791 A1 | 12/2010 |
| EP | 1 160 147 A2 | 12/2001 |
| EP | 2033721 A1 | 3/2009 |
| WO | WO2004048765 A1 | 6/2004 |
| WO | 2010/151838 A2 | 12/2010 |

OTHER PUBLICATIONS

R.D. Maier & J.F. Wallace, Giesserei-Praxis, Druckguss aus Kupferlegierungen, Redaktion: Dipl.-Ing. Ernst Brunhuber, Berlin, den 25. , No. 22, Nov. 1974, pp. 437-446.
"Producing Thin-Wall Zinc Faucet Die Castings," Die Casting Engineer, Mar.-Apr. 1974, pp. 12-14, 16.
R.D. Maier, et al., "Druckguss aus Kupferlegierungen," GieBerei-Praxi, Nov. 25, 1974, pp. 437-446, Nr.22/1974.
European Search Report for corresponding EP 13 16 7144, dated May 6, 2016.
EP Office Action dated Oct. 21, 2016 from corresponding EP 13 167 144.8.

* cited by examiner

DIE CAST COMPONENT AND A METHOD FOR PRODUCING A DIE CAST COMPONENT

CROSS-REFERENCE TO RELATED APPLICATIONS AND CLAIM TO PRIORITY

This application is related to application no. 12 167 501.1, filed May 10, 2012 in the European Patent Office, International Application No. PCT/EP2012/072938 filed Nov. 17, 2012, and International Application No. PCT/EP2012/072939 filed Nov. 17, 2012, the disclosures of which are incorporated herein by reference and to which priority is claimed.

FIELD OF THE INVENTION

The invention relates to a die cast component, in particular a water outlet fitting, comprising a base body produced from metal or a metal alloy by the die casting method and having a cavity in which a number of openings are provided by means of which the cavity is accessible from the outside, the cavity being at least partially filled with a casting core that is in two-dimensional contact with the inside of the base body and in which at least one channel is provided for the conveyance of fluid.

Furthermore, the invention relates to a method for producing a die cast component, in particular a water outlet fitting, comprising a base body with a cavity, a number of openings being provided in the base body by means of which the cavity is accessible from the outside, with the steps:
  providing a die casting tool with a casting core held within the latter,
  producing the base body by die casting, and
  removing the die casting tool from the base body,
the casting core remaining in the base body and at least one channel for fluid conveyance being provided in the casting core.

BACKGROUND OF THE INVENTION

Such cast components and methods for production of the latter are known from the prior art in various configurations. DE 10 2009 024 791 A1, for example, discloses an apparatus and a method for producing a die cast component in which a die casting tool serving as a mold and a lost casting core are used. The lost casting core makes it possible here to obtain a die cast component with a cavity. For this purpose, in a way known in its own right liquid material, in particular heated metal at high pressure, is pressed into the die casting tool. The material fills the space defined by the die casting tool, the area over which the lost casting core extends remaining free. After a pre-specified period of time during which the material cools the die casting tool is removed from the die cast component. Then the lost casting core is broken away from the die cast component, for example thermally, catalytically and/or by breaking up. The die cast component obtained can then be further processed or supplied directly for use.

The production of components by the casting method has proven to be suitable for fluid-conveying components, i.e. components that are provided with fluid-conveying pipes. These can be, for example, sanitary components, in particular water outlet fittings.

In order to produce this type of component, in the way described above a substantially hollow base body made of metal—for example the housing of a water outlet fitting—is first of all produced. Next, further parts such as for example pipes and flow regulation apparatuses are fitted in the interior of the base body. In addition to single valves, mixing cartridges are also used by means of which not only opening and closing of the pipes is made possible, but also the mixing of fluids, in particular of different temperatures.

The installation of further components on or in a water outlet fitting produced by the casting method is partially considered to be disadvantageous, however, because this is associated with a great amount of time and high production costs.

In order to overcome this problem, in US 2003/0062088 A1 it is proposed to incorporate a pipe into the casting core, which is generally made of molding sand. After the casting process this pipe remains in the fitting housing while the molding sand is removed.

In U.S. Pat. No. 5,579,823 A, furthermore, a method for casting a water outlet fitting is described wherein a so-called permanent core is used as a casting core which after the production process remains in the component and serves to provide a water channel in the fitting. The permanent core is made up here of a number of correspondingly molded parts which should be made of a material of which the melting point is higher than the melting point of the material from which the fitting housing is cast.

Finally, EP 2 033 721 A1 discloses a method for producing housings for sanitary fittings. In the latter a pre-molded hollow profile, which is made up of a number of elements and forms a pipe system, is first of all provided and equipped with a covering material in order to obtain a casting core for the casting process. In particular it is proposed to use molding sand as the covering material which can be removed again after the casting process via the cold water connection.

SUMMARY OF THE INVENTION

Proceeding from this prior art it is an object of the present invention to provide a fluid-conveying cast component of the type specified at the start which can be produced easily and inexpensively, it being characterized by high quality and reliability. Moreover, it is an object of the present inventions to specify a method for producing this type of cast component.

This object is achieved by a die cast component of the type specified at the start in that the casting core is made of a material the melting point of which is lower than the melting point of the material from which the base body is produced, and that the outside of the casting core rests with at least substantially all of its surface against the inside of the base body.

Moreover, the object is achieved by a method of the type specified at the start in that a casting core made of a material the melting point of which is lower than the melting point of the material from which the base body is produced is used.

Therefore, the idea, known in its own right, underlying the invention is in a fluid-conveying component which has been produced by the die casting method, to leave the whole casting core, which is normally removed after the casting process, in the base body that has been produced and to use the latter specifically for fluid conveyance, i.e. the conveyance of any fluids, in particular liquids, steam or gas. For this purpose at least one channel for fluid conveyance is provided in the casting core required for the casting. In this way it is made possible to supply the cast component according to the invention for use, for example on a wash basin or a bath tub, directly after completion of the casting process. No pipes—formed as separate components—need to be provided in the base body of the cast component because the casting core formed according to the invention takes over the function of the pipes. The base body of the cast component, which is generally produced from a metal, is thus prevented from coming into contact with the fluid. The base body is therefore automatically protected against corrosion by the casting core without measures causing additional costs, such as for example plastic sealing of the inside of the base body, being required. In principle the cast component according to the invention can be made of any fluid-conveying, in particular water-conveying component. It can be, for example, a fitting, in particular a water outlet fitting or also a valve.

Since this is a casting core which has been used for the casting process, the latter completely fills the base body at least in those sections for the molding of which it is responsible so that in these sections its entire outer surface is in contact with the inside of the base body that has been produced. In this way the casting core is automatically held in the base body without fastening means additionally having to be provided and which would give rise to additional complexity and cost.

The cast component according to the invention can be obtained easily and be supplied for use after a comparably short production time. The channel provided in the casting core is characterized here by a high degree of leak tightness. The cast component obtained can therefore be used particularly reliably, in particular in the sanitary domain.

According to the invention a material is used for the casting core the melting point of which is lower than the melting point of the material, i.e. of the metal or the metal alloy, from which the base body is produced. Advantageously the melting temperature or melting point of the casting core material is at least 30° C., preferably at least 50° C. and in particular at least 100° C. lower than the melting point of the material, of which the base body consists. Plastic materials, in particular fiber-reinforced and/or glass fiber-reinforced plastics are preferably used here to which optionally ceramic and/or glass portions can be added. These materials offer the advantage that the casting core is easy to produce and process.

It is essential here that in the die casting metal alloys are used the melting point of which is relatively low, for example in comparison with steel alloys, and in addition components produced by the die casting method only have a small wall thickness of a few millimeters. For example, the base body can be made of a zinc alloy the melting temperature of which is generally in the range of 400 to 420° C. In this case the base body can have a wall thickness in the range of 1.0 to 3.5 mm, in particular in the range of 1.5 to 2.5 mm, and preferably in the region of approximately 2 mm. Alternatively magnesium alloys can be used the melting point of which is approximately 620° C. and higher. With this type of magnesium alloy wall thicknesses in the range of 1.0 to 4.5 mm, in particular in the range of 2.0 to 3.0 mm, and preferably in the region of approximately 2.5 mm can be produced. When using aluminum alloys the melting temperatures are 690° C. or higher. A base body made of this type of aluminum alloy has a wall thickness of 1.0 to 4.5 mm, in particular in the range of 2.0 to 3.0 mm, and preferably in the region of 2.5 mm.

Most plastics have melting points that are lower than the specified temperatures, and so a wide selection of materials is available for the casting core.

The casting core can be made in one part so that it completely fills the base body in those sections for the molding of which it is responsible during the casting process. Alternatively, it is also possible to use a number of casting core elements which are then responsible for the molding of respectively adjacent sections of the base body to be produced and fill the latter, in particular forming a respective channel section of the channel used for fluid conveyance. This has proven to be particularly advantageous if a cavity with a comparably complex structure is to be obtained. Then a number of less complexly shaped casting core parts can be put together to form a casting core of the desired shape.

It is possible, for example, to provide a casting core element for the base section of a water outlet fitting and a further casting core element for an arm projecting out of the base section. It is essential that the casting core elements are respectively made in one part, i.e. quasi monolithically from a consistent material and so are not made up of a number of segments from the inside to the outside, as is the case with the composite casting cores which are known from US 2003/0062088 or EP 2 033 721 A1.

According to one embodiment of the invention provision is made such that in a predominant part—i.e. at least 60% or 70%—of the contact surface, in particular almost the entire contact surface region—i.e. at least 80% or 90% of the contact surface region—and in particular the entire contact surface region between the casting core and the base body, the wall thickness of the casting core is as great as or greater than the wall thickness of the base body. Here the wall thickness of the casting core can be of dimensions such that it is at least 1.3 times, in particular at least 1.5 times as great as the wall thickness of the base body. Since the wall thickness in the region of the casting core in the entire region of the die cast component is at least as great as the wall thickness of the base body to be cast itself, sufficient heat absorption capacity during the casting process is guaranteed. Furthermore, the wall thickness is sufficiently great that the pressures occurring during the die casting can be compensated. The casting core can optionally be provided with reinforcing ribs and/or bars. Furthermore, bars which pass through the channel can also be provided in the channel. If a number of casting core elements are used, these should engage with one another, the corresponding crossover regions between the casting elements being correspondingly rounded in order to keep the stresses occurring during the die casting as small as possible. To a certain extent areas can of course also remain here in which the wall thickness of the casting core remains smaller than the wall thickness of the base body. This is the case in particular in the areas in which during the die casting a core can be introduced from the outside into the casting mould which optionally supports the casting core from the inside. Corresponding wall regions are therefore provided first and foremost in the region of the openings of the base body.

According to one embodiment of the present invention provision can be made such that two of the openings in the base body are connected to one another by the channel. This is particularly advantageous if the cast component is in the form of a water outlet fitting. The channel can then connect an inlet opening in the water outlet fitting, to which for example a supply pipe for water is connected, to an outlet opening by means of which water can be let into a wash basin or a bath tub.

In a further configuration of the present invention provision is made such that a casting core made of a material approved for conveying water, in particular for conveying drinking water, is used. In particular for the case where the cast component according to the invention is used for conveying drinking water, the material from which the casting core is produced must fulfill particular hygiene and safety requirements in addition to temperature stability. These requirements are met by materials which are approved for the conveyance of drinking water.

A further embodiment is characterized in that a casting core produced by the casting method is used. This method has proven to be particularly suitable for obtaining casting cores of the desired and required form. Within the framework of the casting process in particular casting cores with a complex geometry can be produced here. In order to obtain a multi-part casting core, the individual parts in particular are cast separately or in separate moulds and are then assembled.

In a further development of the invention at least one fastening recess for holding fastening means in order to attach the cast component to a further component, in particular a washstand or a wash basin, in particular at least one threaded hole, is provided in the casting core. In this configuration the casting core is used not only in order to provide channels serving as fluid pipes, but the casting core is formed such that it is possible to fasten the cast component to a further component. For this purpose one or more fastening recesses are provided in the casting core which can hold fastening means, for example a threaded bushing. Alternatively, the thread can also be introduced directly into the casting core, for example within the framework of the casting process of the casting core, or by subsequent drilling. One can then introduce into the thread a screw, by means of which the water outlet fitting can be fixed to a wash basin in a way known in its own right.

According to a further embodiment of the invention, there is provided in the casting core a receiving area for a flow regulation apparatus and in the base body an opening by means of which the flow regulation apparatus can be introduced at least partially into the receiving area.

In this embodiment the casting core is configured such that a flow regulation apparatus can be placed in the latter. Therefore, additional fastening means for fixing the flow regulation apparatus in the base body are not required. The production of the cast component is thus simplified to a considerable extent and the production costs can be reduced.

The flow regulation apparatus is advantageously formed and arranged here such that it is integrated into the at least one channel for fluid conveyance so that the fluid flow can be regulated by the latter by means of the flow regulation apparatus. If a hot or cold water pipe is provided, the flow regulation apparatus advantageously comprises a mixing cartridge in order to be able to set a desired water temperature by mixing. Here in particular two channels, which at their one end are respectively connected to a hot or cold water supply line and the other end of which opens out into the flow regulation apparatus, are provided in the casting core. A further channel or channel section then leads from the flow regulation apparatus to an outlet opening of the cast component so that water at a temperature set by a user can be let into a wash basin or a bath tub. This configuration is similar to the water conveyance known from the prior art in a water outlet fitting with a mixing cartridge, the water pipes being formed by the channels provided according to the invention in the casting core.

In a further development of the invention the at least one channel and/or the at least one fastening recess and/or a receiving area for a flow regulation apparatus are provided in the casting core before casting the base body. In this case the component does not have to be subjected to any further processing directly after the casting process for producing the base body before it is supplied for use because the casting core already has the properties required for fluid conveyance.

If the foundry core is also produced within the framework of a casting process, provision can be made in particular such that the at least one channel and/or the at least one fastening recess and/or a receiving area for a flow regulation apparatus is introduced into the casting core while casting the casting core. Alternatively, the casting core can be cast as a solid body, the at least one channel and/or the at least one fastening recess and/or a receiving area for a flow regulation apparatus being introduced into the casting core following the casting of the casting core, for example by drilling.

Provision can be made here in particular such that the casting core is reworked before or after the casting of the base body, and this is particularly advantageous if the at least one channel and/or the at least one fastening recess and/or a receiving area for a flow regulation apparatus do not yet have the desired dimensions or these have changed during casting.

Alternatively, the at least one channel and/or the at least one fastening recess and/or a receiving area for a flow regulation apparatus can also be provided after the casting process of the casting body in the casting core. Then e.g. a casting core in the form of a solid body can first of all be held in the casting tool for production of the base body by casting, and following the production the casting core surrounded by the base body is reworked. Here the fastening recess and the receiving area can be provided in the casting core in particular by means of the openings in the base body by drilling if this is appropriate.

BRIEF DESCRIPTION OF THE DRAWINGS

With regard to further advantageous configurations and further developments of the invention reference is made to the sub-claims and to the following description of an exemplary embodiment with reference to the attached drawings. The drawings show as follows:

DETAILED DESCRIPTION OF THE PREFERRED EMBODIMENT(S)

Figure 1:
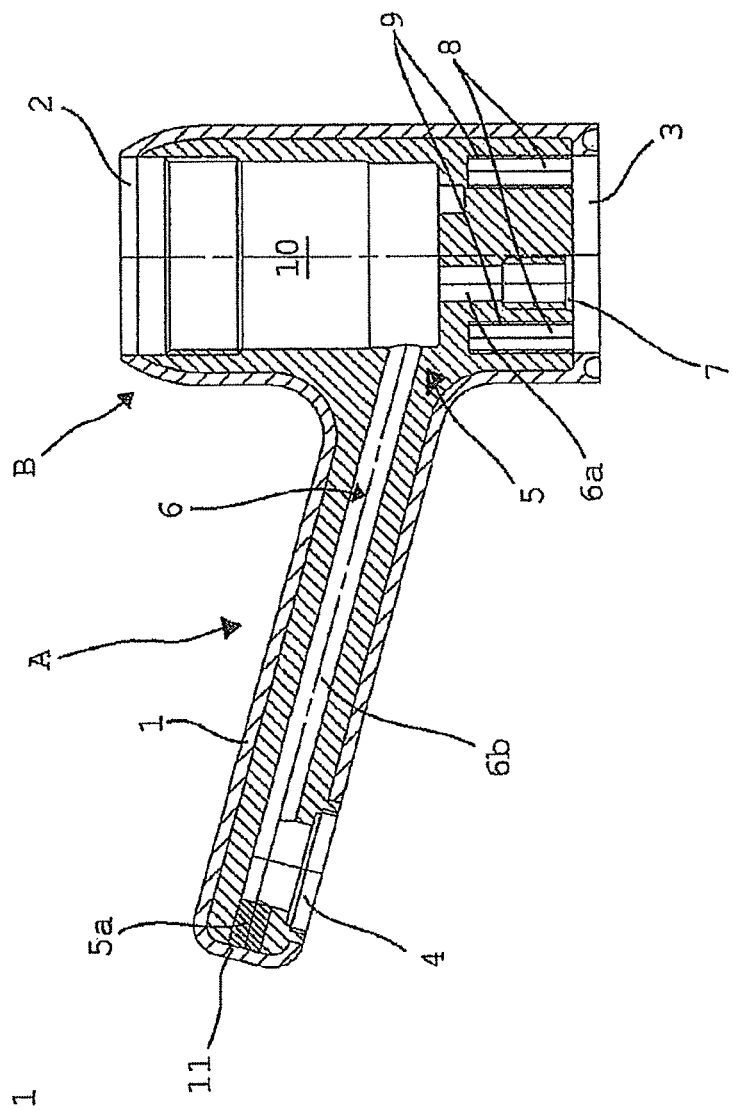
FIG. 1 a sectional illustration of a die cast component according to the invention in the form of a water outlet fitting.

FIG. 1 shows a cast component according to the invention which is in the form of a water outlet fitting. The latter comprises a base body produced by the die casting method which here forms the housing 1 of the water outlet fitting and is made of a metal alloy suitable for die casting, in particular a zinc alloy, an aluminum alloy or a magnesium alloy.

The housing 1 of the water outlet fitting is made hollow and is formed by a substantially cylindrical base section B and an arm A projecting from the latter to the side. At the upper end of the cylindrical base section B there is an opening 2 for a flow regulation apparatus that is not drawn in. On its lower side the cylindrical base section B further comprises an opening 3 for the supply of water and the fastening of the water outlet fitting to a further component, in particular to a wash basin (not shown). On the lower side of the projecting arm A there is a water outlet opening 4 in the region of which a threaded hole extends into which a beam shaper (aerator) can be screwed. By means of the three openings 2, 3, 4 in the housing 1 the interior of the housing 1 is accessible from the outside.

The interior of the housing 1 is almost completely filled with a casting core 5 which is in two-dimensional contact with the inside of the housing 1 in all of the wall sections of the housing 1 for the molding of which it is responsible during the die casting. The two-dimensional contact guarantees that the casting core 5 sits securely in the housing 1 and can not slip. Furthermore, the housing 1 is configured such that it is not possible for the casting core 5 to fall out.

In the foundry core 5 there is a channel 6 serving as a water pipe which connects a water inlet opening 7, which lies in the region of the lower opening 3 of the cylindrical base section B and is accessible by means of the latter, to the water outlet opening 4. A water feed pipe (not shown) can be connected to the water inlet opening 7 in order to feed the water outlet fitting with water. For this purpose there is provided in the region of the water inlet opening 7 a threaded hole into which the water feed pipe can be screwed.

The casting core 5 further comprises two fastening recesses 8 for holding fastening means which are in the form of threaded holes 9 here. These are provided in order to attach the water outlet fitting to a further component, for example a washstand or a wash basin, which is not shown, however, in the figure.

Furthermore, a receiving area 10 for a flow regulation apparatus is provided in the casting core 5. The receiving area 10 is formed by a recess in the casting core 5 which extends substantially in the upper region of the cylindrical base section B of the casting core 5. By means of the upper opening 2 the flow regulation apparatus can be introduced at least partially into the receiving area 10.

The receiving area 10 is arranged here such that it interrupts the channel 6 so that a first section 6a of the channel 6 extends from the inlet opening 7 into the receiving area 10, and a second section 6b of the channel 6 runs from the receiving area 10 to the water outlet opening 2. If the flow regulation apparatus is placed in the receiving area 10, by means of the latter the flow of water through the channel 6 can be regulated.

The casting core 5 is made here of a fiber-reinforced plastic and has been produced by the casting process. Optionally, the channel 6, the fastening recesses 8 and the receiving area 10 can be at least partially introduced into the casting core 5 while the latter is cast, or the casting core 5 is cast as a solid body and the channel 6, the fastening recesses 8 and the receiving area 10 are provided by drilling in the casting core 5 after the casting. In the exemplary embodiment shown the latter is the case.

Since the section 6b of the channel 6 is to be drilled from the front face edge 11 of the casting core 5, the channel section 6b extends here to the face side 11 where it opens out into an opening. This opening determined by the drilling is closed by a small part section 5b which is part of the casting core 5. Therefore the casting core 5 is formed in two parts.

As can be seen in the drawing, the wall thickness of the casting core is greater in nearly all areas than the wall thickness of the base body 1, which is approximately 2 mm. Only on the upper end region of the base body B, where the casting core 5 tapers, is there an exception. In the region of the arm A the wall thickness of the casting core 5 is more than twice as thick as the wall thickness of the base body 1, and in the region of the base body the wall thickness proportions are between 1.5 at the upper end region of the base body B and even 6 in the lower end region.

Figure 2:
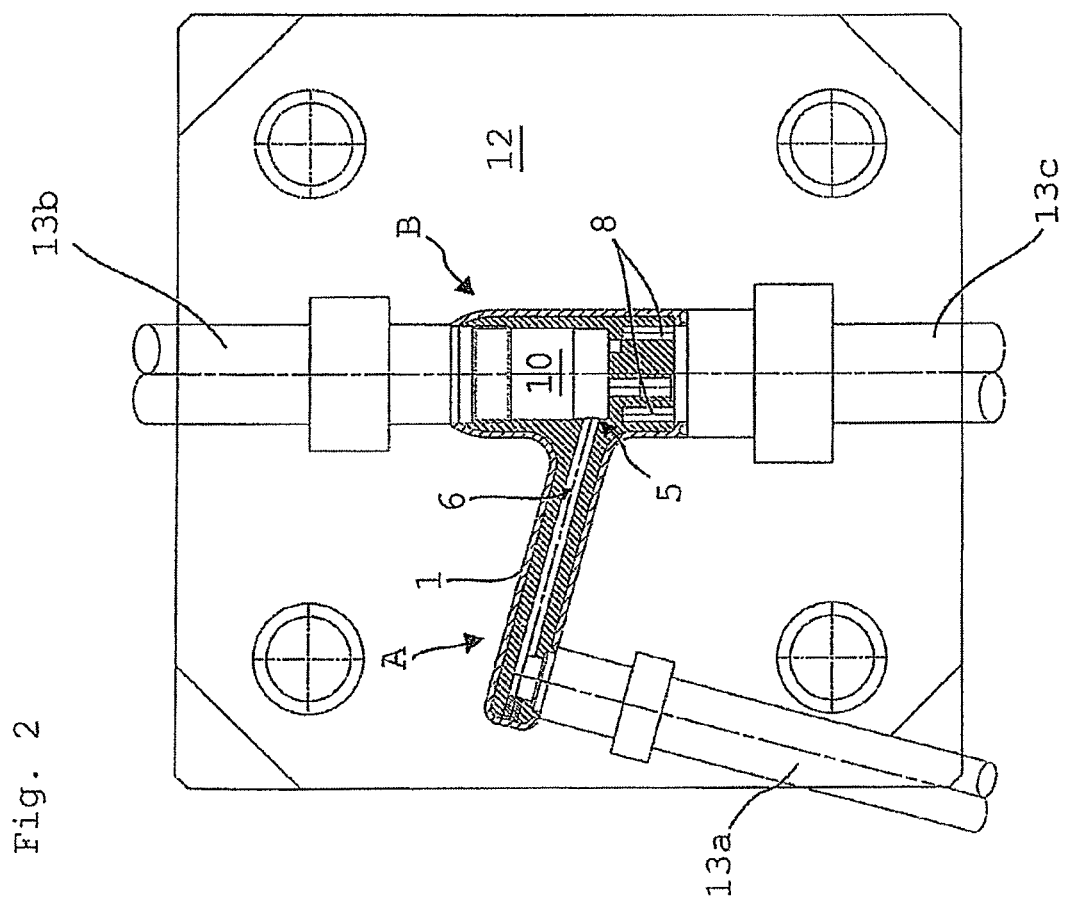
FIG. 2 the die cast component shown in FIG. 1 in a die casting tool.

In order to produce the water outlet fitting according to the invention a die casting tool 12, formed in two parts here, is initially provided, as shown in FIG. 2. In the die casting tool 12 the casting core 5 is held by a total of three dies 13a, 13b, 13c. By means of the dies 13a, 13b, 13c all of the openings in the casting core 5 are closed so that within the framework of the die casting process no material can pass into the channel 6, the fastening recesses 8 or the receiving area 10. There extends between the casting core 5 and the die casting tool 12 a free area by means of which the mold of the housing 1 of the water outlet fitting to be produced by the die casting method is defined.

Liquid metal, here zinc, is pressed under high pressure into the die casting tool 12 so that the space lying between the casting core 5 and the die casting tool 12 is filled. For this purpose there are provided in the die casting tool a number of distribution channels (not drawn in) by means of which the liquid metal can pass into the free space extending between the casting core 5 and the die casting tool 12. After a period of time required for the cooling and curing of the metal, the die casting tool 12 is removed from the housing 1 produced so that the water outlet fitting shown in FIG. 1 is obtained.

The casting core 5, in particular the channel 6 provided in the latter, the fastening recesses 8 and the receiving area 10 can, if so required, be reworked subsequently, or the water outlet fitting is directly fitted to a further component, for example a wash basin, and used.

Figure 3:
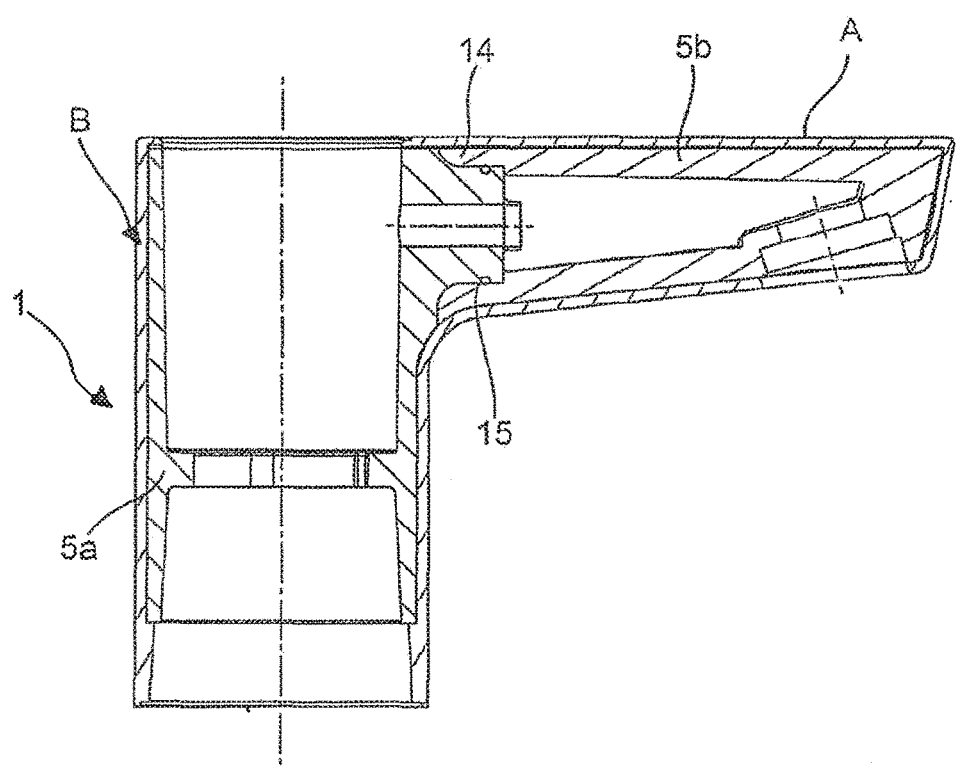
FIG. 3 a sectional illustration of a further die cast component according to the invention in the form of a water outlet fitting.

In FIG. 3 a further embodiment of a water outlet fitting according to the invention is shown. As can be seen easily in this figure, the casting core 5 is made up of two casting core elements 5a, 5b here, the one casting core element 5a being assigned to the base body B and during the casting process being essentially responsible for its molding, while the other casting core element 5b fills the arm A and is responsible for its molding during the die casting. The two casting core elements 5a, 5b engage with one another at the crossover region between the arm A and the base body B, for which purpose a round receptacle 14 is formed in the casting core element 5b which fills the arm A, and an appendage 15 engaging in the receptacle 14 is formed on the other casting core element 5a. It can be seen easily that the wall section defining the receptacle is very rounded on its face side and the regions thus coming into contact are correspondingly contoured so that smooth crossovers are formed in order to avoid stress peaks during the die casting.

It will be apparent to one of ordinary skill in the art that various modifications and variations can be made in construction or configuration of the present invention without departing from the scope or spirit of the invention. Thus, it is intended that the present invention cover all such modifications and variations, and as may be applied to the central features set forth above.

We claim:

1. A die cast component comprising a base body produced from metal or a metal alloy by die casting and having a cavity in which three openings are provided, each of which allows the cavity to be accessible from outside of the base body, the cavity being at least partially filled with a casting core that remains within the die cast component and is in two-dimensional contact with the inside of the base body and in which at least one channel within the casting core is provided for the conveyance of fluid, wherein the casting core comprises ceramic and/or glass portions and a plastic material, the melting point of the plastic material is lower than the melting point of the material from which the base body is produced, and that the outside of the casting core rests with at least substantially all of its surface against the inside of the base body and the inside of the casting core in is exposed to the cavity.

2. The die cast component according to claim 1, wherein the casting core is made in one part.

3. The die cast component according to claim 1, wherein the casting core is divided into a number of casting core elements lying one behind the other and each defining a channel section, the casting core elements each being made in one part.

4. The die cast component according to claim 1, wherein in a predominant part of the contact surface, the wall thickness of the casting core is as great as or greater than the wall thickness of the base body.

5. The die cast component according to claim 4, wherein the base body is made of a zinc alloy and has a wall thickness in the range of 1.0 to 3.5 mm.

6. The die cast component according to claim 4, wherein the base body is made of a magnesium alloy and has a wall thickness in the range of 1.0 to 4.5 mm.

7. The die cast component according to claim 4, wherein the base body is made of an aluminum alloy and has a wall thickness in the range of 1.0 to 4.5 mm.

8. The die cast component according to claim 4, wherein the wall thickness of the casting core is at least 1.3 times as great as the wall thickness of the base body.

9. The cast component according to claim 1, wherein there is provided in the casting core at least one fastening recess for holding fastening means in order to attach the cast component to a further component.

10. The cast component according to claim 1, wherein there is provided in the casting core a receiving area for a flow regulation apparatus and the base body has an opening by means of which the flow regulation apparatus is introduced at least partially into the receiving area.

11. The die cast component according to claim 1, wherein the die cast component is a water outlet fitting.

12. A die cast component comprising a base body produced from metal or a metal alloy by die casting and having a cavity in which three openings are provided, each of which allows the cavity to be accessible from the outside, the cavity being at least partially filled with a casting core that remains within the die cast component and is in two-dimensional contact with the inside of the base body and in which at least one channel within the casting core is provided for the conveyance of fluid, wherein the casting core comprises a plastic material, the melting point of the plastic material is lower than the melting point of the material from which the base body is produced, and that the outside of the casting core rests with at least substantially all of its surface against the inside of the base body and the inside of the casting core is exposed to the cavity, wherein the casting core is provided with reinforcing ribs and/or bars.

13. The die cast component according to claim 12, wherein bars which pass through the at least one channel are provided in the at least one channel.

14. A die cast water outlet fitting, comprising:
 a. a base body formed from a metal or a metal alloy, the base body containing an interior cavity;
 b. three openings formed in the base body and extending therein, each opening allowing the interior cavity to be accessible from outside of the base body; and
 c. a casting core comprises ceramic and/or glass portions and a plastic material, and the plastic material has a melting point lower than the melting point of the base body, the casting core being in two dimensional contact with and lining an interior of the base body, the casting core is exposed to the interior cavity and forming a channel which is in fluid communication with at least one of the three openings.

* * * * *